(12) United States Patent  (10) Patent No.: US 8,085,480 B2
Iwasawa et al.  (45) Date of Patent: Dec. 27, 2011

(54) COMPACT ZOOM LENS

(75) Inventors: Yoshito Iwasawa, Suwon-si (KR); Tsuyoshi Kakimoto, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/903,385

(22) Filed: Oct. 13, 2010

(65) Prior Publication Data

US 2011/0134539 A1    Jun. 9, 2011

(30) Foreign Application Priority Data

Dec. 7, 2009   (KR) .................. 10-2009-0120713

(51) Int. Cl.
 *G02B 15/14*   (2006.01)
(52) U.S. Cl. ........................................ 359/687; 359/676
(58) Field of Classification Search .......... 359/680–682, 359/676, 687
 See application file for complete search history.

(56) References Cited

U.S. PATENT DOCUMENTS

2005/0243437 A1* 11/2005 Hozumi et al. ............... 359/687
* cited by examiner Primary Examiner — James Greece
(74) Attorney, Agent, or Firm — Drinker Biddle & Reath LLP

(57) ABSTRACT

A zoom lens including a first lens group having a negative refractive power, including a negative lens and a positive lens and having at least one aspherical surface, a second lens group having a positive refractive power, a third lens group having a positive refractive power, and a fourth lens group having a positive refractive power. During, zooming from a wide angle position to a telephoto position, the first lens group is moved so that the first lens group at the telephoto position is closer to the object side than the first lens group at the wide angle position, the second lens group is moved, the third lens group is moved toward the object side from the image side, and the fourth lens group is moved so that the distance between the third lens group and the fourth lens group at the telephoto position is larger than the distance therebetween at the wide angle position, and the zoom lens satisfies the following Equations:

$$vdG1-p > 56.0$$

$$2.1 < |\beta 3T/\beta 3W| < 5.5,$$

where $vdG1-p$ is the Abbe's number of the positive lens of the first lens group, $\beta 3T$ is the magnification of the third lens group at the telephoto position and $\beta 3W$ is the magnification of the third lens group at the wide angle position, respectively.

10 Claims, 12 Drawing Sheets

COMPACT ZOOM LENS

CROSS-REFERENCE TO RELATED PATENT APPLICATION

This application claims the benefit of Korean Patent Application No. 10-2009-0120713, filed on Dec. 7, 2009, in the Korean Intellectual Property Office, the disclosure of which is incorporated herein in its entirety by reference.

BACKGROUND OF THE INVENTION

1. Field of the Invention

The invention relates to a zoom lens having a small-sized, compact structure and a high zooming rate.

2. Description of the Related Art

Imaging optical devices such as digital still cameras (DSCs), digital camcorders, or the like, including a solid state imaging device such as a charge coupled device (CCD) or a complementary metal-oxide semiconductor (CMOS) that converts an optical image into an electrical signal, are widely used.

Imaging devices need to have a large number of pixels and thus photographing lenses, in particular, zoom lenses with excellent imaging performances are required to meet the imaging devices with a large number of pixels. In addition, the zoom lenses should have a high zooming rate, i.e., 10 times or greater, a wide viewing angle, etc. Also, portability of the imaging optical devices becomes more important, and various designs to meet demands for zoom lenses having high imaging performance, small size, and light weight have been proposed.

Conventional zoom lenses including first through fourth lens groups as seen from an object to be photographed and respectively having a positive refractive power, a negative refractive power, a positive refractive power, and a positive refractive power have been widely used. Also, research on designs of zoom lenses having a high zooming rate, good aberration correction, and a small size has increased.

SUMMARY OF THE INVENTION

An embodiment of the invention provides a zoom lens having a small-sized, compact structure and a high zooming rate.

According to an embodiment of the invention, there is provided a zoom lens including: a first lens group having a positive refractive power, including a negative lens and a positive lens and having at least one aspherical surface; a second lens group having a negative refractive power; a third lens group having a positive refractive power; and a fourth lens group having a positive refractive power and including a single lens; wherein the first lens group, the second lens group, the third lens group, and the fourth lens group are sequentially arranged from an object side to an image surface side, wherein, during zooming from a wide angle position to a telephoto position, the first lens group is moved so that the first lens group at the telephoto position is closer to the object side than the first lens group at the wide angle position, the second lens group is moved, the third lens group is moved toward the object side from the image side, and the fourth lens group is moved so that a distance between the third lens group and the fourth lens group at the telephoto position is larger than a distance therebetween at the wide angle position, and wherein the at least one aspherical surface of the first lens group is formed such that a positive refractive power of the aspherical surface is reduced as the aspherical surface gets closer to its circumferential portion from the optical axis with respect to a spherical lens having a paraxial radius of curvature of the aspherical surface, and the zoom lens satisfies the following Equations:

$$vdG1\text{-}p2 > 56.0$$

$$2.1 < |\beta 3T/\beta 3W| < 5.5,$$

where vdG1-p is an Abbe's number of the positive lens of the first lens group, $\beta 3T$ is the magnification of the third lens group at the telephoto position and $\beta 3W$ is the magnification of the third lens group at the wide angle position.

The fourth lens group may include a single lens.

The zoom lens may satisfy the following Equation:

$$2.5 < |fG1\text{-}n/fG1\text{-}p| < 7.5,$$

where fG1-n is the focal length of the negative lens of the first lens group and fG1-p is the focal length of the positive lens of the first lens group.

The zoom lens may satisfy the following Equation:

$$2.35 < |\beta 2T/\beta 2W| < 5.0,$$

where $\beta 2T$ is the magnification of the second lens group at the telephoto position and $\beta 2W$ is the magnification of the second lens group at the wide angle position.

The zoom lens may satisfy the following Equation:

$$13.2 < |fG1\text{-}n/fw| < 50.0,$$

where fG1-n is the focal length of the negative lens of the first lens group and fw is the overall focal length at the wide angle position.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

The invention will now be described more fully with reference to the accompanying drawings, in which exemplary embodiments of the invention are shown.

Figure 1:
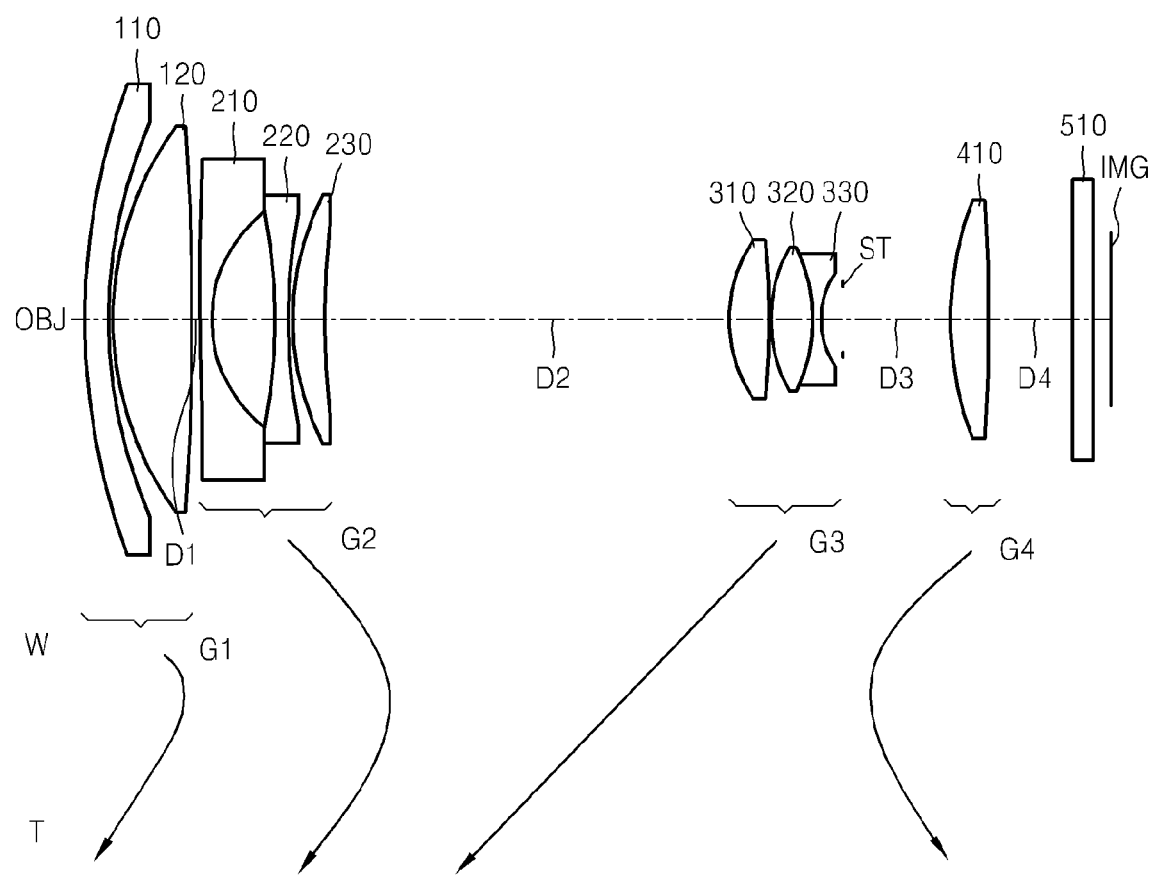
FIG. 1 is a cross-sectional view of an optical arrangement and movement of a zoom lens during zooming from a wide-angle position to a telephoto position, according to an embodiment of the invention.
Figure 5:
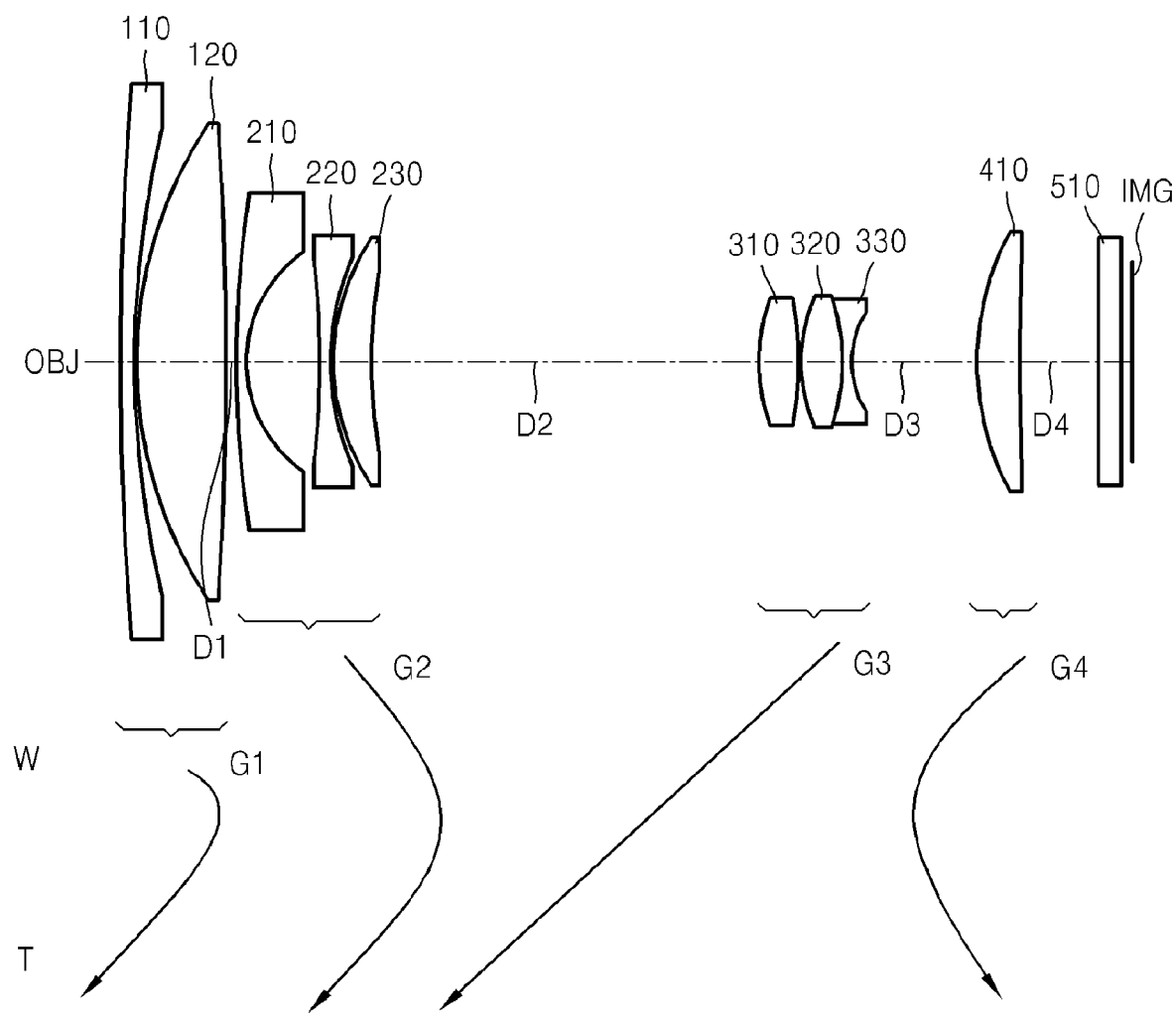
FIG. 5 is a cross-sectional view of an optical arrangement and movement of a zoom lens during zooming from a wide angle position to a telephoto position, according to another embodiment of the invention.
Figure 9:
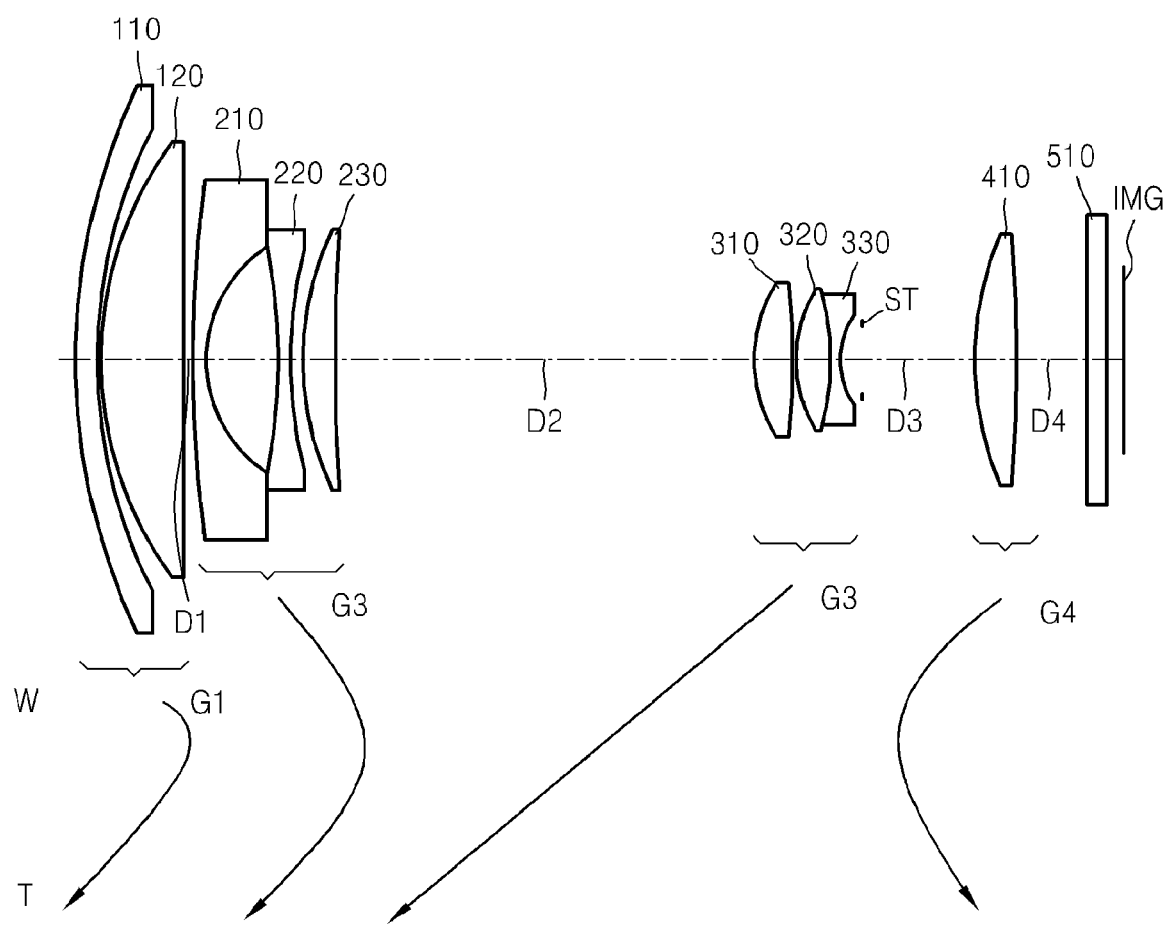
FIG. 9 is a cross-sectional view of an optical arrangement and movement of a zoom lens during zooming from a wide angle position to a telephoto position, according to another embodiment of the invention.

FIGS. 1, 5, and 9 are cross-sectional views of the optical arrangement of zoom lenses according to various embodiments of the invention. Referring to FIGS. 1, 5, and 9, each of the embodiments includes a first lens group G1 having a positive refractive power, a second lens group G2 having a negative refractive power, a third lens group G3 having a positive refractive power, and a fourth lens group G4 having a positive refractive power, which are sequentially arranged from the object side OBJ to the image side IMG of the zoom lens. An infrared filter 510 may be disposed at the image side of the fourth lens group G4. The image side IMG is an imaging plane of an imaging device (not shown) such as a charge coupled device (CCD) or a complementary metal oxide semiconductor (CMOS).

Each of the first through fourth lens groups G1, G2, G3, and G4 of the zoom lenses of FIGS. 1, 5, and 9 is moved along an optical axis. In detail, during zooming from a wide angle position to a telephoto position, the first lens group G1 is moved so that the first lens group G1 at the telephoto position may be closer to the object side OBJ than the first lens group G1 at the wide angle position, the second lens group G2 is moved, the third lens group G3 is moved toward the object side OBJ from the image side IMG, and the fourth lens group G4 is moved so that the distance between the third lens group G3 and the fourth lens group G4 at the telephoto position may be larger than a distance therebetween at the wide angle position. A trajectory of a lens during zooming from the wide angle position to the telephoto position is shown as arrows. An iris diaphragm ST may be disposed closest to the image side IMG of the third lens group G3 or at a lens surface that is closest to the object side OBJ of the third lens group G3 and is moved together with the third lens group G3 during zooming from a wide angle position to a telephoto position.

The first lens group G1 is composed of a negative lens, and a positive lens at an air interval with the negative lens, in an order from the object side OBJ, so as to increase a zooming rate of the zoom lens and to miniaturize the zoom lens. When the first lens group G1 includes two lenses such as a negative lens and a positive lens, eccentricity sensitivity with respect to the two lenses increases. Thus, the two lenses may need to be assembled with very high precision so as to guarantee high imaging performance. Thus, eccentricity sensitivity of the two lenses needs to be reduced as much as possible while the amount of aberration of the two lenses is adjusted. To this end, the first lens group G1 includes at least one aspherical surface. The aspherical surface is formed such that a positive refractive power of the aspherical surface is reduced or a negative refractive power thereof is increased as the aspherical surface gets closer to its circumferential portion from the optical axis with respect to a spherical lens having a paraxial radius of curvature of the aspherical surface. Meanwhile, the first lens group G1 may satisfy the following Equation 1:

$$vdG1-p > 56.0, \tag{1}$$

where $vdG1-p$ is an Abbe's number of the positive lens of the first lens group G1.

In Equation 1, the range of the Abbe's number of the positive lens of the first lens group $vdG1-p$ is defined. Thus, axial chromatic aberration at the telephoto position and chromatic difference of magnification at the wide angle position are simultaneously corrected.

The zoom lenses of FIGS. 1, 5, and 9 may satisfy the following Equation 2:

$$2.1 < |\beta 3T/\beta 3W| < 5.5, \tag{2}$$

where $\beta 3T$ is the magnification of the third lens group G3 at the telephoto position and $\beta 3W$ is the magnification of the third lens group G3 at the wide angle position.

In Equation 2, the zooming rate of the third lens group G3 is defined. In detail, in the case of less than the lower limit of Equation 2, i.e., when the zooming rate of the third lens group G3 is reduced, a function of a zooming operation of the third lens group G3 is lowered, and a high zooming rate of the zoom lens may not be achieved. In addition, in the case of a value higher than the upper limit of Equation 2, the function of the zooming operation of the third lens group G3 is increased, and the amount of aberration at the telephoto position is increased. Thus, the third lens group G3 is not easily constituted with a smaller number of lenses. By satisfying Equation 2, change of the magnification of each lens group is achieved in balance, during zooming from the wide angle position to the telephoto position.

The zoom lenses of FIGS. 1, 5, and 9 may also satisfy the following Equation 3:

$$2.5 < |fG1-n/fG1-p| < 7.5, \tag{3}$$

where $fG1-n$ is the focal length of the negative lens of the first lens group G1 and $fG1-p$ is the focal length of the positive lens of the first lens group G1.

In Equation 3, the ratio of the focal length of the negative lens of the first lens group G1 to the focal length of the positive lens of the first lens group G1 is defined. In detail, in the case of less than the lower limit of Equation 3, i.e., when the focal length of the negative lens of the first lens group G1 is reduced, the amount of coma aberration and the amount of astigmatic field curvature are increased. Simultaneously, eccentricity sensitivity with respect to the negative lens of the first lens group G1 is increased, and high precision of assembling is required. In addition, in the case of a value higher than the upper limit of Equation 3, i.e., when the focal length of the negative lens of the first lens group G1 is increased, the size of the zoom lens increases in a direction of a radius of the lens, and the optical system is not easily miniaturized.

The zoom lenses of FIGS. 1, 5, and 9 may also satisfy the following Equation 4:

$$2.35 < |\beta 2T/\beta 2W| < 5.0, \tag{4}$$

where $\beta 2T$ is the magnification of the second lens group G2 at the telephoto position and $\beta 2W$ is the magnification of the second lens group G2 at the wide angle position.

In Equation 4, the zooming rate of the second lens group G2 is defined. In detail, in the case of a value smaller than the lower limit of Equation 4, i.e., when the zooming rate of the second lens group G2 is reduced, a function of a zooming operation using the second lens group G2 is lowered, and a high zooming rate of the zoom lens is not easily achieved. In addition, in the case of a value higher than the upper limit of Equation 4, i.e., when the zooming rate of the second lens group G2 is increased, the function of the zooming operation using the second lens group G2 is increased, and the amount of aberration at the telephoto position is increased. Thus, the second lens group G2 is not easily constituted with a smaller number of lenses. By satisfying Equation 4, change of the magnification of each lens group during zooming from the wide angle position to the telephoto position is achieved in balance.

The zoom lenses of FIGS. 1, 5, and 9 may also satisfy the following Equation 5:

$$13.2 < |fG1-n/fw| < 50.0, \tag{5}$$

where $fG1-n$ is the focal length of the negative lens of the first lens group G1 and $fw$ is the focal length of the entire zoom lens at the wide angle position.

In Equation 5, a ratio of the focal length of the negative lens of the first lens group G1 to the focal length of the entire zoom lens at the wide angle position is defined. In detail, in the case of a value smaller than the lower limit of Equation 5, i.e., when the focal length of the negative lens of the first lens group G1 is reduced, the amount of coma aberration and the amount of astigmatic field curvature are increased. Simultaneously, eccentricity sensitivity is increased, and high precision of assembling is required. In addition, in the case of a value higher than the upper limit of Equation 5, i.e., when the focal length of the negative lens of the first lens group G1 is increased, the size of the zoom lens increases in a direction of a radius of a lens, and the optical system is not easily miniaturized.

Hereinafter, specific structures of the zoom lenses of FIGS. 1, 5, and 9 and lens data thereof will be described. Aspherical surface is defined by the following equation:

$$Z = \frac{Ch^2}{1 + \sqrt{1 - \varepsilon C^2 h^2}} + A4 \cdot h^4 + A6 \cdot h^6 + A8 \cdot h^8 + A10 \cdot h^{10}, \quad (6)$$

where h is the height in the direction perpendicular to the optical axis, Z is the distance from a vertex of a lens along the optical axis direction at the height h, C is paraxial radius of curvature, $\varepsilon$ is a conic constant, and A4, A6, A8, and A10 are aspherical coefficients.

Hereinafter, f is the combined focal length of the whole lens system, Fno is an F number, and ω is a half-viewing angle. The symbol * indicated at the number of lens surfaces means that the lens surface is an aspherical surface. In each of the following embodiments, D1, D2, D3, and D4 are variable distances at the wide angle, middle angle, and telephoto positions.

First Embodiment

FIG. 1 is a cross-sectional view of an optical arrangement and movement of a zoom lens during zooming from a wide angle position to a telephoto position, according to an embodiment of the invention. Referring to FIG. 1, the zoom lens according to the present embodiment includes a first lens group G1, a second lens group G2, a third lens group G3, and a fourth lens group G4. The first lens group G1 includes a negative lens and a positive lens. The first lens group G1 includes a first lens 110 that is a negative lens having a concave surface toward the image side IMG, and a second lens 120 that is a positive lens having a severe convex surface toward the object side OBJ and both surfaces are aspherical, for example. The second lens group G2 includes a third lens 210 that is a negative lens having a concave surface toward the image side IMG, a fourth lens 220 that is a biconcave lens, and a fifth lens 230 that is a positive lens. The third lens group G3 includes a sixth lens 310 that is a positive lens having both surfaces aspherical, a seventh lens 320 that is a positive lens, and an eighth lens 330 that is a negative lens, wherein the seventh lens 320 and the eighth lens 330 constitute a cemented lens. The fourth lens group G4 includes a positive lens, for example, a ninth lens 410 having both aspherical surfaces. An iris diaphragm ST is disposed closest to the image side IMG of the third lens group G3.

Figure 2:
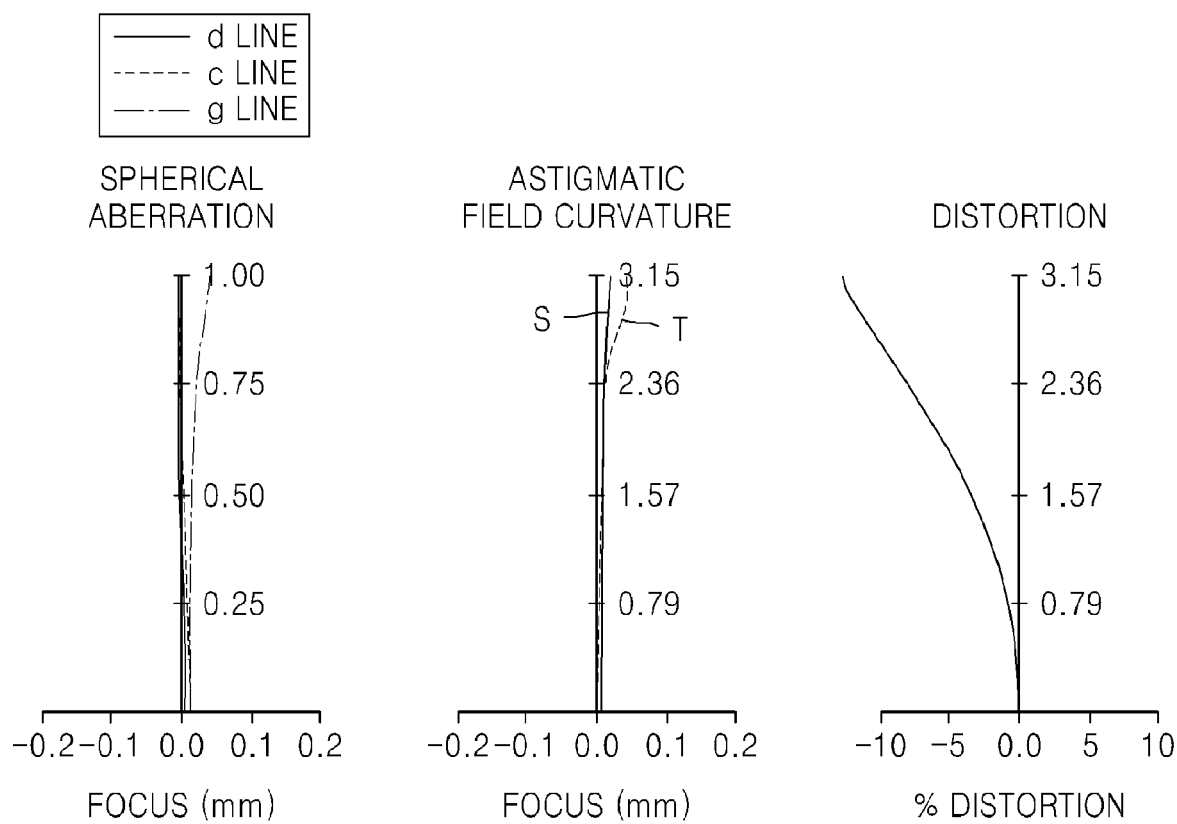
FIGS. 2, 3, and 4 are charts of aberration showing spherical aberration, astigmatic field curvature, and distortion aberration at a wide angle position, a middle angle position, and a telephoto position of the zoom lens of FIG. 1, respectively.
Figure 3:
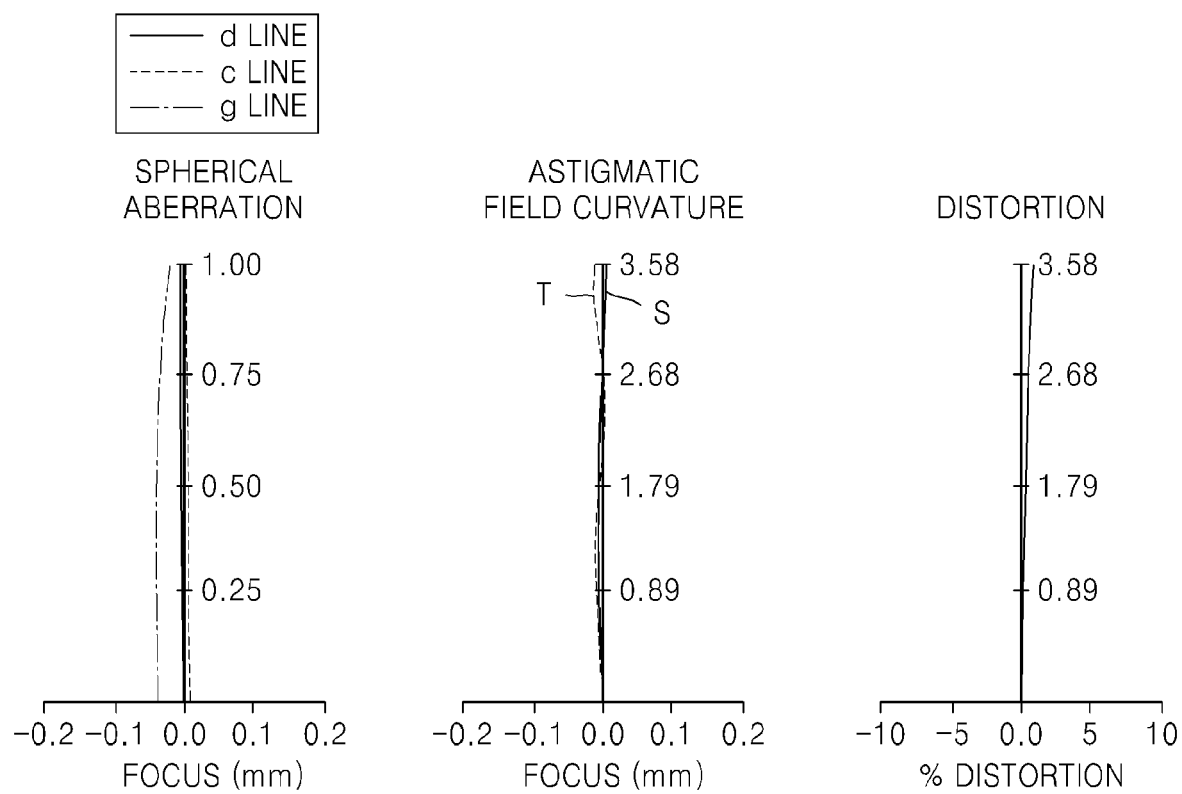
Figure 4:
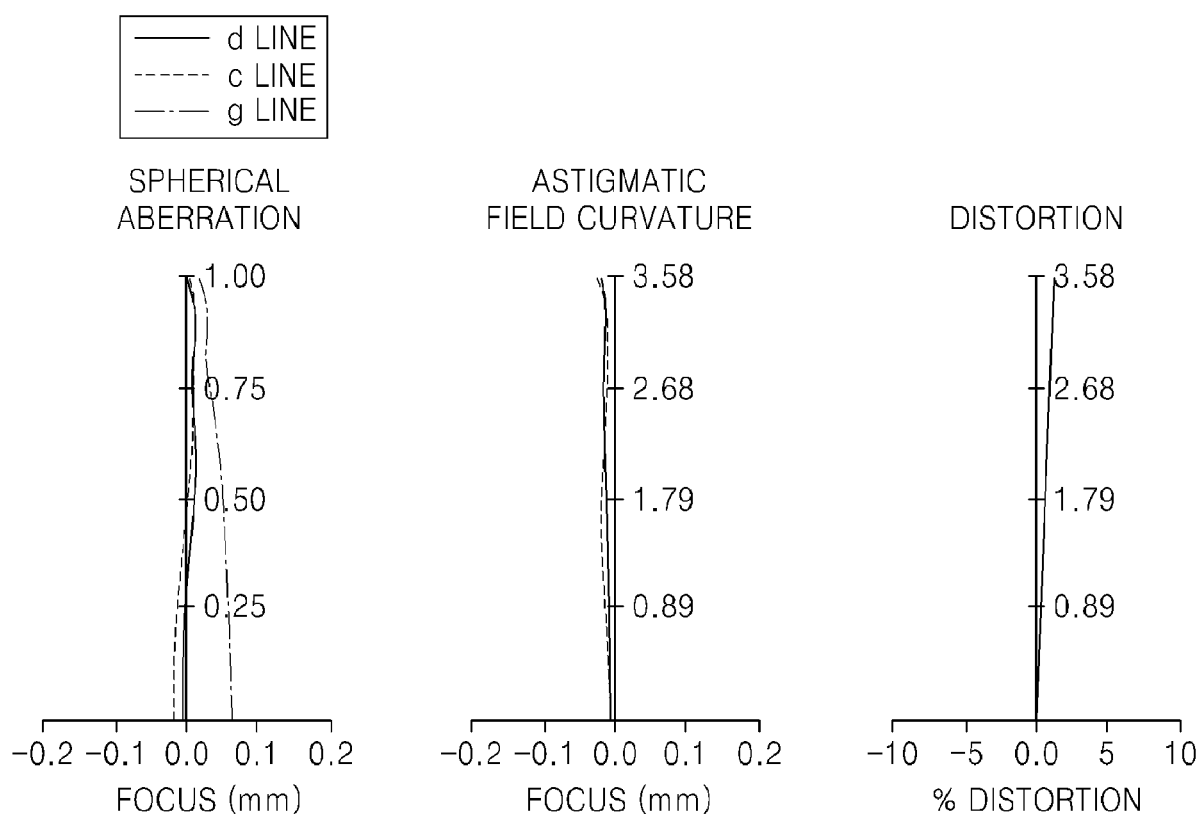

FIGS. 2, 3, and 4 are aberration charts showing longitudinal spherical aberration, astigmatic field curvature, and distortion aberration at wide angle, middle angle, and telephoto positions of the zoom lens of FIG. 1, respectively. Longitudinal spherical aberration is shown with respect to light having a wavelength of 656.28 nm, indicated as c line, light having a wavelength of 587.56 nm, indicated as d line, and light having a wavelength of 435.83 nm, indicated as g line. Astigmatic field curvature includes tangential field curvature T and sagittal field curvature S.

The following represents lens data of the zoom lens of FIG. 1.

| | | | |
|---|---:|---:|---:|
| Fno | 3.29 | 4.61 | 5.99 |
| f | 4.76 | 18.70 | 45.90 |
| ω | 37.10 | 10.73 | 4.40 |
| D1 | 0.363 | 7.382 | 10.541 |
| D2 | 16.345 | 2.712 | 0.635 |
| D3 | 4.303 | 3.298 | 21.780 |
| D4 | 3.387 | 9.613 | 2.505 |

| Lens surface | Radius of curvature (R) | Thickness (D) | Refractive index (nd) | Abbe's number (vd) |
|---:|---:|---:|---:|---:|
| 1 | 27.375 | 0.950 | 1.92286 | 20.88 |
| 2 | 20.154 | 0.120 | | |
| 3* | 13.033 | 3.198 | 1.59201 | 67.02 |
| 4* | −100.291 | D1 | | |
| 5 | 192.186 | 0.500 | 1.88300 | 40.81 |
| 6 | 5.640 | 2.550 | | |
| 7 | −23.403 | 0.500 | 1.77250 | 49.62 |
| 8 | 23.403 | 0.219 | | |
| 9 | 11.331 | 1.276 | 1.94595 | 17.98 |
| 10 | 44.154 | D2 | | |
| 11* | 5.629 | 1.610 | 1.59201 | 67.02 |
| 12* | −22.732 | 0.100 | | |
| 13 | 6.613 | 1.621 | 1.59282 | 68.62 |
| 14 | −6.953 | 0.400 | 1.60342 | 38.01 |
| 15 | 3.448 | 0.863 | | |
| 16 | INF | D3 | | |
| 17* | 13.582 | 1.571 | 1.51470 | 63.80 |
| 18* | −66.936 | D4 | | |
| 19 | INF | 0.800 | 1.51680 | 64.20 |
| 20 | INF | 0.700 | | |

-continued

| Surface | ϵ | A4 | A6 | A8 | A10 |
|---|---|---|---|---|---|
| 3 | 1.0000 | 0.525762E−05 | −0.418657E−06 | 0.419749E−08 | −0.321999E−10 |
| 4 | 1.0000 | 0.471092E−04 | −0.707099E−06 | 0.975660E−08 | −0.616666E−10 |
| 11 | 2.0675 | −0.129439E−02 | −0.477166E−04 | −0.169266E−05 | −0.570579E−07 |
| 12 | 1.0000 | 0.274998E−03 | −0.141239E−06 | −0.933054E−06 | 0.224465E−06 |
| 17 | 1.0000 | 0.837015E−04 | −0.418807E−04 | 0.347417E−05 | −0.769845E−07 |
| 18 | 1.0000 | 0.170356E−03 | −0.716715E−04 | 0.554312E−05 | −0.125037E−06 |

Second Embodiment

FIG. 5 is a cross-sectional view of an optical arrangement and movement of a zoom lens during zooming from a wide angle position to a telephoto position, according to another embodiment of the invention. Referring to FIG. 5, the zoom lens according to the present embodiment includes a first lens group G1, a second lens group G2, a third lens group G3, and a fourth lens group G4. The first lens group G1 includes a negative lens and a positive lens. The first lens group G1 includes a first lens 110 that is a negative lens having a concave surface toward the image side IMG, and a second lens 120 that is a positive lens having a severe convex surface toward the object side OBJ and both surfaces, for example. The second lens group G2 includes a third lens 210 that is a negative lens having a concave surface toward the image side IMG, a fourth lens 220 that is a biconcave lens, and a fifth lens 230 that is a positive lens. The third lens group G3 includes a sixth lens 310 that is a positive lens having both surfaces aspherical, a seventh lens 320 that is a positive lens, and an eighth lens 330 that is a negative lens, wherein the seventh lens 320 and the eighth lens 330 constitute a cemented lens. The fourth lens group G4 includes a positive lens, for example, a ninth lens 410 having both surfaces aspherical. An iris diaphragm (not shown) is disposed on a lens surface closest to the image side IMG of the third lens group G3.

Figure 6:
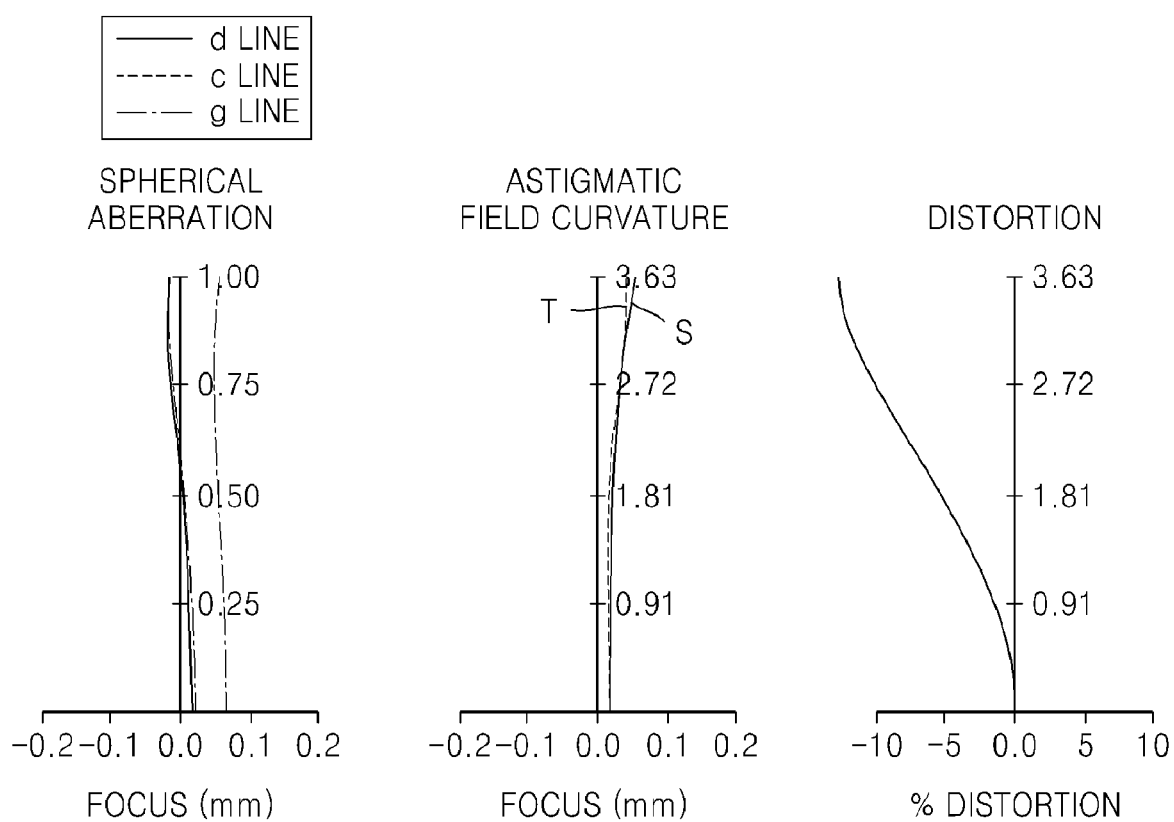
FIGS. 6, 7, and 8 are aberration charts showing spherical aberration, astigmatic field curvature, and distortion aberration at a wide angle position, a middle angle position, and a telephoto position of the zoom lens of FIG. 5, respectively.
Figure 7:
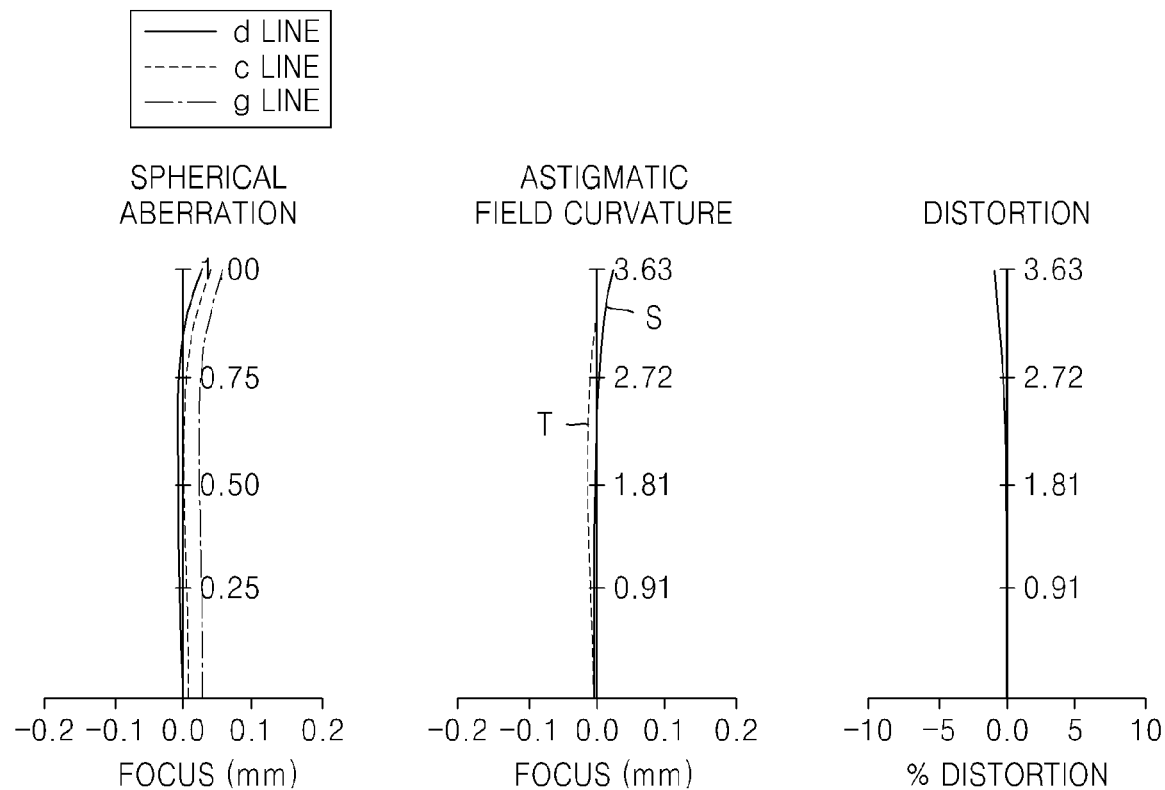
Figure 8:
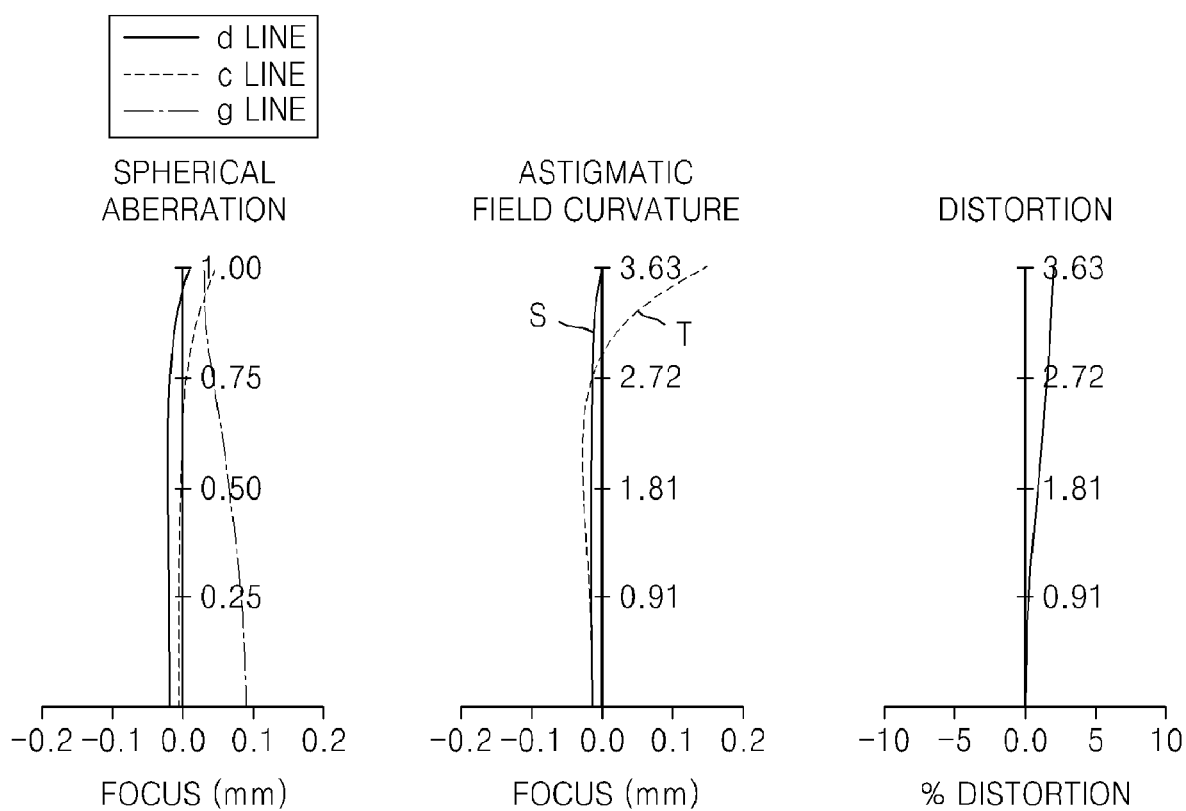

FIGS. 6, 7, and 8 are aberration charts showing longitudinal spherical aberration, astigmatic field curvature, and distortion aberration at wide angle, middle angle, and telephoto positions of the zoom lens of FIG. 5, respectively. Longitudinal spherical aberration is shown with respect to light having a wavelength of 656.28 nm, indicated as c line, light having a wavelength of 587.56 nm, indicated as d line, and light having a wavelength of 435.83 nm, indicated as g line. Astigmatic field curvature includes tangential field curvature T and sagittal field curvature S.

The following represents lens data of the zoom lens of FIG. 5.

| | | | | |
|---|---|---|---|---|
| Fno | 3.33 | 4.54 | 6.05 | |
| f | 4.14 | 15.87 | 38.80 | |
| ω | 41.21 | 12.86 | 5.34 | |
| D1 | 0.300 | 9.334 | 15.386 | |
| D2 | 13.700 | 2.344 | 0.370 | |
| D3 | 4.444 | 4.682 | 15.039 | |
| D4 | 2.798 | 7.431 | 2.000 | |

| Lens surface | Radius of curvature (R) | Thickness (D) | Refractive index (nd) | Abbe's number (vd) |
|---|---|---|---|---|
| 1 | 105.806 | 0.500 | 1.84666 | 23.78 |
| 2 | 36.418 | 0.100 | | |
| 3* | 14.593 | 3.200 | 1.61881 | 63.86 |
| 4* | −94.041 | D1 | | |
| 5 | 34.102 | 0.400 | 1.91082 | 35.25 |
| 6 | 4.830 | 2.604 | | |
| 7 | −35.946 | 0.400 | 1.61800 | 63.40 |
| 8 | 9.689 | 0.100 | | |
| 9 | 7.925 | 1.324 | 2.00272 | 19.32 |
| 10 | 23.377 | D2 | | |
| 11* | 5.322 | 1.465 | 1.60606 | 55.30 |
| 12 | −16.652 | 0.100 | | |
| 13 | 6.399 | 1.414 | 1.69680 | 55.46 |
| 14 | −8.225 | 0.350 | 1.69895 | 30.05 |
| 15 | 3.348 | D3 | | |
| 16* | 9.683 | 1.546 | 1.55332 | 71.68 |
| 17 | 135.313 | D4 | | |
| 18 | INF | 0.800 | 1.51680 | 64.20 |
| 19 | INF | 0.700 | | |

| Surface | ϵ | A4 | A6 | A8 | A10 |
|---|---|---|---|---|---|
| 3 | 1.0000 | −0.174363E−04 | −0.646144E−07 | 0.000000E+00 | 0.000000E+00 |
| 4 | 1.0000 | 0.179995E−04 | 0.000000E+00 | 0.000000E+00 | 0.000000E+00 |
| 11 | 0.2925 | −0.447347E−03 | −0.118516E−04 | −0.577305E−06 | 0.000000E+00 |
| 16 | 1.0000 | −0.152099E−03 | 0.144511E−04 | −0.274463E−06 | 0.000000E+00 |

Third Embodiment

FIG. 9 is a cross-sectional view of an optical arrangement and movement of a zoom lens during zooming from a wide angle position to a telephoto position, according to another embodiment of the invention. Referring to FIG. 9, the zoom lens according to the present embodiment includes a first lens group G1, a second lens group G2, a third lens group G3, and a fourth lens group G4. The first lens group G1 includes a negative lens and a positive lens. The first lens group G1 includes a first lens 110 that is a negative lens having a concave surface toward the image side IMG, and a second lens 120 that is a positive lens having a severe convex surface toward the object side OBJ and both surfaces are aspherical, for example. The second lens group G2 includes a third lens 210 that is a negative lens having a concave surface toward the image side IMG, a fourth lens 220 that is a biconcave lens, and a fifth lens 230 that is a positive lens. The third lens group G3 includes a sixth lens 310 that is a positive lens having both aspherical surfaces, a seventh lens 320 that is a positive lens, and an eighth lens 330 that is a negative lens, wherein the seventh lens 320 and the eighth lens 330 constitute a cemented lens. The fourth lens group G4 includes a positive lens, for example, a ninth lens 410 having both surfaces aspherical. An iris diaphragm ST is disposed closest to the image side IMG of the third lens group G3.

Figure 10:
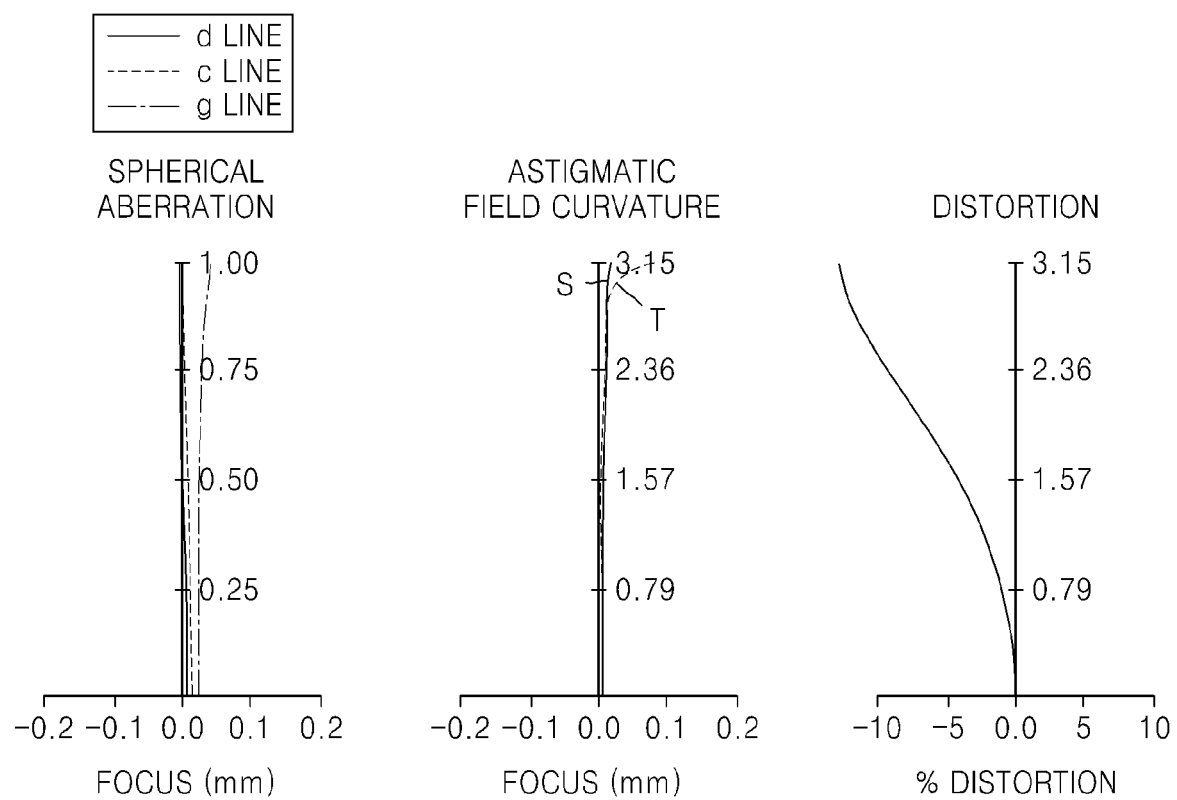
FIGS. 10, 11, and 12 are aberration charts showing spherical aberration, astigmatic field curvature, and distortion aberration at a wide angle position, a middle angle position, and a telephoto position of the zoom lens of FIG. 9, respectively.
Figure 11:
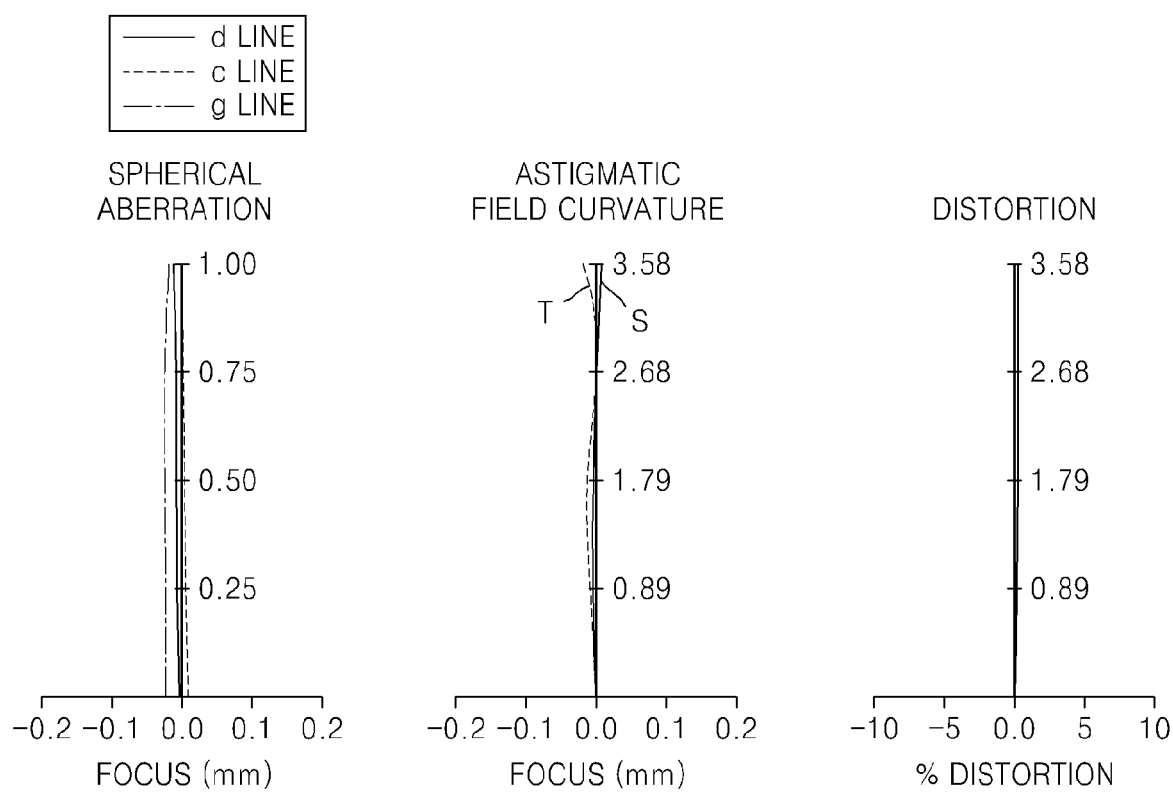
Figure 12:
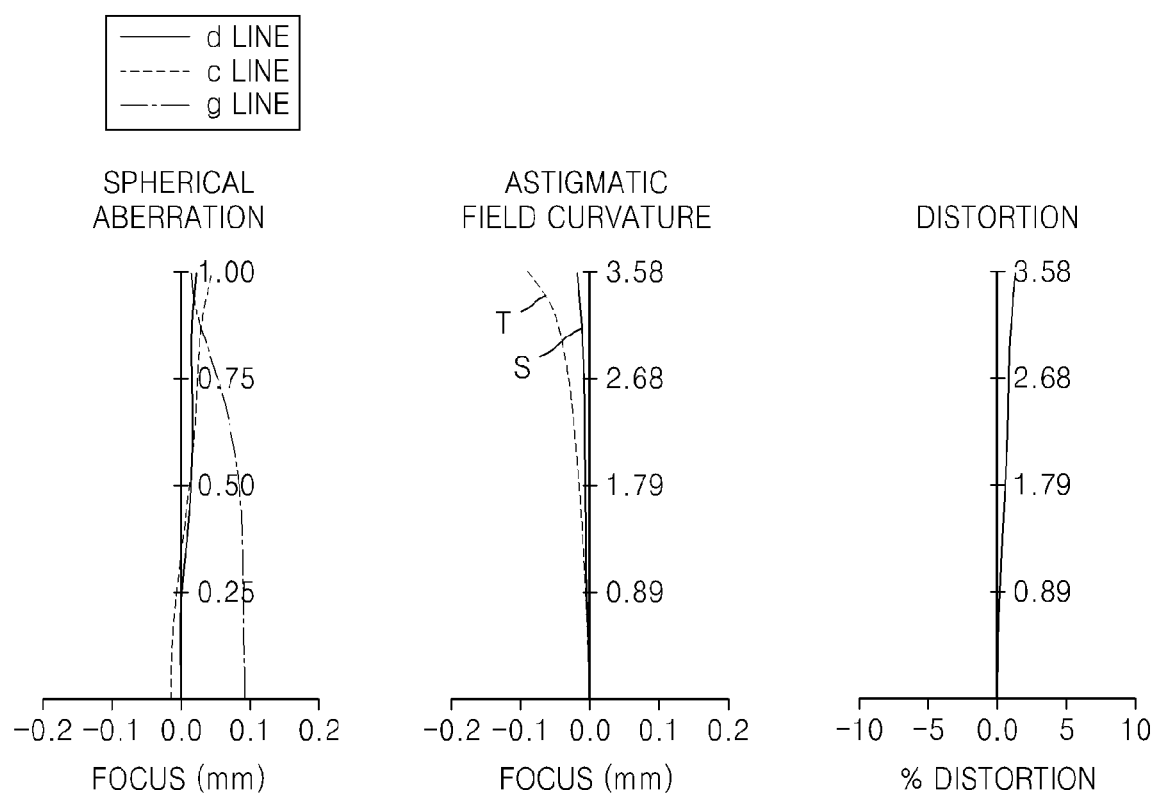

FIGS. 10, 11, and 12 are aberration charts showing longitudinal spherical aberration, astigmatic field curvature, and distortion aberration at wide angle, middle angle, and telephoto positions of the zoom lens of FIG. 5, respectively. Longitudinal spherical aberration is shown with respect to light having a wavelength of 656.28 nm, indicated as c line, light having a wavelength of 587.56 nm, indicated as d line, and light having a wavelength of 435.83 nm, indicated as g line. Astigmatic field curvature includes tangential field curvature T and sagittal field curvature S.

The following represents lens data of the zoom lens of FIG. 9.

| | | | | |
|---|---|---|---|---|
| Fno | 3.29 | 4.80 | 5.98 | |
| f | 4.10 | 16.10 | 45.10 | |
| ω | 37.10 | 10.73 | 4.40 | |
| D1 | 0.360 | 8.521 | 13.937 | |
| D2 | 16.400 | 2.840 | 0.603 | |
| D3 | 4.450 | 2.723 | 20.778 | |
| D4 | 2.771 | 9.584 | 3.727 | |

| Lens surface | Radius of curvature (R) | Thickness (D) | Refractive index (nd) | Abbe's number (vd) |
|---|---|---|---|---|
| 1 | 24.126 | 0.900 | 1.94595 | 17.98 |
| 2 | 20.146 | 0.120 | | |
| 3* | 14.189 | 3.282 | 1.55332 | 71.68 |
| 4* | −287.407 | D1 | | |
| 5 | 51.367 | 0.500 | 1.88300 | 40.81 |
| 6 | 5.333 | 2.845 | | |
| 7 | −24.359 | 0.500 | 1.88300 | 40.81 |
| 8 | 18.940 | 0.446 | | |
| 9 | 12.078 | 1.302 | 1.94595 | 17.98 |
| 10 | 89.200 | D2 | | |
| 11* | 5.280 | 1.550 | 1.58313 | 59.46 |
| 12* | −20.341 | 0.100 | | |
| 13 | 5.494 | 1.330 | 1.59282 | 68.62 |
| 14 | −10.711 | 0.400 | 1.63980 | 34.57 |
| 15 | 3.228 | 0.860 | | |
| 16 | INF | D3 | | |
| 17* | 13.024 | 1.610 | 1.51470 | 63.80 |
| 18* | −73.314 | D4 | | |
| 19 | INF | 0.800 | 1.51680 | 64.20 |
| 20 | INF | 0.700 | | |

| Surface | ε | A4 | A6 | A8 | A10 |
|---|---|---|---|---|---|
| 3 | 1.0000 | 0.508480E−05 | −0.172079E−06 | 0.581634E−10 | 0.444060E−11 |
| 4 | 1.0000 | 0.300787E−04 | −0.344578E−06 | 0.281636E−08 | −0.708118E−11 |
| 11 | 1.8707 | −0.133653E−02 | −0.545621E−04 | −0.196966E−05 | −0.829790E−07 |
| 12 | 1.0000 | 0.336711E−03 | −0.455699E−05 | −0.903601E−06 | 0.235456E−06 |
| 17 | 1.0000 | 0.320473E−04 | −0.213632E−04 | 0.831050E−06 | 0.301682E−08 |
| 18 | 1.0000 | 0.130747E−03 | −0.390136E−04 | 0.176181E−05 | −0.132994E−07 |

The following table shows that the first through third embodiments satisfy conditions of Equations 1 through 5.

| Equation | First embodiment | Second embodiment | Third embodiment |
|---|---|---|---|
| (1) vdG1 − p | 67.02 | 63.86 | 71.68 |
| (2) \|β3T/β3W\| | 3.506 | 2.592 | 4.147 |
| (3) \|fG1 − n/fG1 − p\| | 4.456 | 3.168 | 5.797 |
| (4) \|β2T/β2W\| | 2.613 | 3.407 | 2.814 |
| (5) \|fG1 − n/fw\| | 18.366 | 15.740 | 34.960 |

As described above, through the above-described lens configuration, a zoom lens having a small-size, light-weight, good aberration correction, and a high zooming rate can be provided.

The zoom lenses of FIGS. 1, 5, and 9 can be employed in various types of imaging devices including an imaging element for forming an image of a subject from light that is incident through the zoom lenses.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
   a first lens group having a positive refractive power, including a negative lens and a positive lens and having at least one aspherical surface;
   a second lens group having a negative refractive power;
   a third lens group having a positive refractive power; and
   a fourth lens group having a positive refractive power and including a single lens;
   wherein the first lens group, the second lens group, the third lens group, and the fourth lens group are sequentially arranged from an object side to an image surface side,
   wherein, during zooming from a wide angle position to a telephoto position, the first lens group is moved so that the first lens group at the telephoto position is closer to the object side than the first lens group at the wide angle position, the second lens group is moved, the third lens group is moved toward the object side from the image side, and the fourth lens group is moved so that the distance between the third lens group and the fourth lens group at the telephoto position is larger than the distance therebetween at the wide angle position, and
   wherein the at least one aspherical surface of the first lens group is formed such that the positive refractive power of the aspherical surface is reduced as the aspherical surface gets closer to its circumferential portion from the optical axis with respect to a spherical lens having a paraxial radius of curvature of the aspherical surface, and
   the zoom lens satisfies the following Equations:

$$vdG1\text{-}p > 56.0$$

$$2.1 < |\beta 3T/\beta 3W| < 5.5,$$

where vdG1-p is an Abbe's number of the positive lens of the first lens group, $\beta 3T$ is the magnification of the third lens group at the telephoto position and $\beta 3W$ is the magnification of the third lens group at the wide angle position.

2. The zoom lens of claim 1, wherein the zoom lens satisfies the following Equation:

$$2.5 < |fG1\text{-}n/fG1\text{-}p| < 7.5,$$

where fG1-n and fG1-p are the focal length of the negative lens of the first lens group and the focal length of the positive lens of the first lens group, respectively.

3. The zoom lens of claim 1, wherein the zoom lens satisfies the following Equation:

$$13.2 < |fG1\text{-}n/fw| < 50.0,$$

where fG1-n and fw are the focal length of the negative lens of the first lens group and the entire focal length at the wide angle position, respectively.

4. The zoom lens of claim 1, wherein the zoom lens satisfies the following Equation:

$$2.35 < |\beta 2T/\beta 2W| < 5.0,$$

where $\beta 2T$ and $\beta 2W$ are the magnification of the second lens group at the telephoto position and the magnification of the second lens group at the wide angle position, respectively.

5. A zoom lens comprising:
   a first lens group having a positive refractive power, including a negative lens and a positive lens and having at least one aspherical surface;
   a second lens group having a negative refractive power;
   a third lens group having a positive refractive power; and
   a fourth lens group having a positive refractive power;
   wherein the first lens group, the second lens group, the third lens group, and the fourth lens group are sequentially arranged from an object side to an image surface side,
   wherein, during zooming from a wide angle position to a telephoto position, the first lens group is moved so that the first lens group at the telephoto position is closer to the object side than the first lens group at the wide angle position, the second lens group is moved, the third lens group is moved toward the object side from the image side, and the fourth lens group is moved so that the distance between the third lens group and the fourth lens group at the telephoto position is larger than the distance therebetween at the wide angle position, and
   wherein the at least one aspherical surface of the first lens group is formed such that a positive refractive power of the aspherical surface is reduced as the aspherical surface gets closer to its circumferential portion from the optical axis with respect to a spherical lens having a paraxial radius of curvature of the aspherical surface, and
   the zoom lens satisfies the following Equations:

$$vdG1\text{-}p > 56.0$$

$$2.1 < |\beta 3T/\beta 3W| < 5.5$$

$$2.5 < |fG1\text{-}n/fG1\text{-}p| < 7.5,$$

where vdG1-p is an Abbe's number of the positive lens of the first lens group, $\beta 3T$ and $\beta 3W$ are the zooming rate of the third lens group at the telephoto position and the zooming rate of the third lens group at the wide angle position, respectively, and fG1-n and fG1-p are the focal length of the negative lens of the first lens group and the focal length of the positive lens of the first lens group, respectively.

6. The zoom lens of claim 5, wherein the zoom lens satisfies the following Equation:

$$13.2 < |fG1\text{-}n/fw| < 50.0,$$

where fG1-n and fw are the focal length of the negative lens of the first lens group and the entire focal length at the wide angle position, respectively.

7. The zoom lens of claim 5, wherein the zoom lens satisfies the following Equation:

$$2.35 < |\beta 2T/\beta 2W| < 5.0,$$

where $\beta 2T$ and $\beta 2W$ are the magnification of the second lens group at the telephoto position and the magnification of the second lens group at the wide angle position, respectively.

8. A zoom lens comprising:
   a first lens group having a positive refractive power, including a negative lens and a positive lens and having at least one aspherical surface;
   a second lens group having a negative refractive power;
   a third lens group having a positive refractive power; and
   a fourth lens group having a positive refractive power;
   wherein the first lens group, the second lens group, the third lens group, and the fourth lens group are sequentially arranged from an object side to an image surface side,
   wherein, during zooming from a wide angle position to a telephoto position, the first lens group is moved so that the first lens group at the telephoto position is closer to the object side than the first lens group at the wide angle position, the second lens group is moved, the third lens group is moved toward the object side from the image side, and the fourth lens group is moved so that the distance between the third lens group and the fourth lens group at the telephoto position is larger than the distance therebetween at the wide angle position, and wherein the at least one aspherical surface of the first lens group is formed such that the positive refractive power of the aspherical surface is reduced as the aspherical surface gets closer to its circumferential portion from the optical axis with respect to a spherical lens having a paraxial radius of curvature of the aspherical surface, and the zoom lens satisfies the following Equations:

$$vdG1-p > 56.0$$

$$2.1 < |\beta 3T/\beta 3W| < 5.5$$

$$13.2 < |fG1-n/fw| < 50.0,$$

where vdG1–p is an Abbe's number of the positive lens of the first lens group, $\beta 3T$ and $\beta 3W$ are the magnification of the third lens group at the telephoto position and the zooming rate of the third lens group at the wide angle position, respectively, and fG1–n and fw are the focal length of the negative lens of the first lens group and the entire focal length at the wide angle position, respectively.

9. The zoom lens of claim 8, wherein the zoom lens satisfies the following Equation:

$$2.35 < |\beta 2T/\beta 2W| < 5.0,$$

where $\beta 2T$ and $\beta 2W$ are the magnification of the second lens group at the telephoto position and the magnification of the second lens group at the wide angle position, respectively.

10. An imaging device comprising:
the zoom lens of claim 1; and
an imaging element for forming an image of a subject from light that is incident through the zoom lens.

* * * * *